United States Patent [19]

Dittrich

[11] Patent Number: 5,701,259

[45] Date of Patent: Dec. 23, 1997

[54] METHOD FOR STABILIZING THE DIRECTIONAL DISPLAY OF MAGNETIC COMPASSES

[75] Inventor: Frank Dittrich, Rebstein, Switzerland

[73] Assignee: Leica AG, Wetzlar, Germany

[21] Appl. No.: 553,833

[22] Filed: Nov. 6, 1995

[30] Foreign Application Priority Data

Nov. 9, 1994 [DE] Germany .......................... 44 39 945.6

[51] Int. Cl.$^6$ .................................................. G01C 17/38
[52] U.S. Cl. ...................... 364/571.01; 364/559; 33/349; 33/359
[58] Field of Search ............................... 73/1 E; 33/349, 33/356, 361; 364/571.01, 443, 559

[56] References Cited

U.S. PATENT DOCUMENTS

| | | | |
|---|---|---|---|
| 5,117,375 | 5/1992 | Worcester et al. | 364/571.01 |
| 5,191,528 | 3/1993 | Yardley et al. | 364/424.027 |
| 5,247,278 | 9/1993 | Pant et al. | 338/32 R |
| 5,297,063 | 3/1994 | Cage | 364/571.02 |

FOREIGN PATENT DOCUMENTS 0 145 950  6/1985  Germany .

Primary Examiner—Ellis B. Ramirez
Assistant Examiner—Demetra R. Smith
Attorney, Agent, or Firm—Foley & Lardner

[57] ABSTRACT

A method is specified for stabilizing the directional display of magnetic compasses on bodies moving in a magnetic field, in particular the terrestrial magnetic field, against magnetic interference sources. The spatial components of the magnetic field vector are measured at a measuring point within a first interference-free measurement region. Taking account of the temporal changes in the measured components, the absolute value of the magnetic field strength and, as a function thereof, a quality function are determined, which quality function is a measure of the temporal distribution of the measured magnetic field vector components and a measure of the quality of the value of the magnetic field strength. For a further measuring point, the quality function and the measured component values are used to estimate the magnetic field vector at this measuring point and to measure the spatial components of this magnetic field vector. A further quality function is determined from the measurements which is combined with the first quality function to form a weighting function with which the components of the new magnetic field vector are weighted in such a way that a stabilized magnetic field vector having stabilized components is obtained. This method can be continued by iteration.

13 Claims, 3 Drawing Sheets

METHOD FOR STABILIZING THE DIRECTIONAL DISPLAY OF MAGNETIC COMPASSES

FIELD OF THE INVENTION

The invention relates to a method for stabilizing the directional display of magnetic compasses.

BACKGROUND OF THE INVENTION

A navigation system for a vehicle is described in U.S. Pat. No. 5,235,514. Components of this system include a sensor for detecting the direction of movement and the steering angle velocity of a moving body, and a magnetic field sensor by means of which the terrestrial magnetic field is measured. The absolute course of a moving body is determined from the measured values for the terrestrial magnetic field. If the moving body is magnetized, the terrestrial magnetic field becomes superimposed and output errors occur in the magnetic field sensor. In order to prevent such an error from occurring, an initial calibration of the magnetic field sensor is carried out. If, however, the body moves through regions which contain magnetic interference sources, such as level crossings, railroad underbridges, underground power cables, steel-reinforced concrete walls etc., the moving body is exposed to strong magnetic interference, with the result that the magnetization of the moving body varies.

If, on the other hand, the sensor for the steering angle velocity is used to determine the course of the moving body, difficulties likewise arise with respect to the desired accuracy, as is specified in more detail in U.S. Pat. No. 5,235,514.

In order to overcome these difficulties, U.S. Pat. No. 5,235,514 proposes a device for detecting a course which can accurately estimate the current course of a moving body by analyzing and determining individually the error factors which are respectively contained in the course data of the magnetic sensor and in the angular velocity data of the angular velocity sensor. Furthermore, the magnitude of the contribution of the respectively instantaneous measured data of the angular velocity sensor and of the magnetic sensor to the measured data already obtained is determined. During the calculations, Kalman filters are used to determine expected values or estimated values for the estimated course of the moving body.

The problem of the influence of strong interference sources, such as railroad bridges etc., on the terrestrial magnetic field is discussed in the conference report of the Deutsche Gesellschaft für Ortung und Navigation e.V. (German Society for Position Finding and Navigation) on symposium "Land Vehicle Navigation" 1984 in Monster, Federal Republic of Germany, in an article by Rogge (pages 18.23 and 18.24). One possibility of suppressing such interference is specified as using a simple sensor which is stable in the short term in addition to a flux gate. If large differences occur between the measurement results of the flux gate and the additional sensor, the aim is then to rely on the measurement result of the additional sensor.

Another possibility for suppressing interference is provided in accordance with this conference report by two mutually spaced flux gates in a vehicle. Assuming that the interference source has a different influence on the two flux gates, the interference vector can essentially be eliminated by subtraction.

A further possibility for suppressing interference proceeds from the fact that the horizontal component of the interference-free terrestrial magnetic field is constant to a large measure. It is then plausible that sudden changes in this component can be used to conclude that the terrestrial magnetic field is experiencing interference. As long as the interference lasts, the angular values are not used to determine the course. After conclusion, an interpolation between the course angle before the interference and the course angle thereafter is carried out. However, this procedure is not accurate. The two angles are generally of the same size in the case of vehicle trips in towns and the like.

A method for determining the direction of travel of a vehicle by means of a geomagnetic sensor is described in German Patent Application DE 40 03 563 C2. The sensor has two windings which intersect at right angles and are arranged in a horizontal position on an annular core. If the vehicle executes a full turn in the homogeneous terrestrial magnetic field and the measured data tapped from the windings of the sensor are represented as points in a plane coordinate system, the totality of the measured points forms a circle denoted as a measured-value circle.

Normally, during the journey of the vehicle, the direction of travel is specified by the direction from the zero point of the measured-value circle to the current measuring point. If, however, the vehicle body is magnetized because of interference affecting the terrestrial magnetic field, this leads to a variation or movement of the center of the measured-value circle and thus to an error in the direction measurement. In order to correct this error, a full turn must be executed by the vehicle and the new center must be determined. In order to be able to carry out the correction more accurately even in an unfavorable magnetic environment, the measured data obtained in the interference-free and interference-affected environment are subjected to an evaluation with regard to their reliability, and during the redetermination of the center a weighting of the previous center and of the provisional center determined on the basis of the new data is performed in accordance with the reliability of the data.

A method for determining the course angle by means of a three-axis magnetometer permanently mounted in an aircraft is described in European Patent Application EP 0 226 653 A1. This application describes coils through which an alternating current flows and which have an iron core serving as sensors. Errors in the accuracy of the course which occur in the vehicle owing to magnetic interference fields are compensated by an automatic calibration. For this purpose, a calibration flight which includes specific prescribed flight maneuvers is carried out starting from an initial reference direction determined in the interference-free environment. In this case, deviations of the instantaneous magnetic field components from the reference components are detected continuously and read into a computing unit. In accordance with a suitable calibration function, the computing unit determines correction coefficients as a function of the attitude angles of the flight maneuver. The calculation formulae are based on the formulae of the discrete Kalman filter, which is particularly suitable for recurslye calculations. After each new observation of the deviations, new coefficients are calculated from the preceding coefficients.

European Patent application EP 0 145 950 A1 discloses a compound navigation method for road vehicles, in which the terrestrial magnetic field vector is measured by means of two magnetic field probes, arranged separated from one another in space in the vehicle, and corrected by means of interference field vectors which are stored separately for each probe. The two values for the terrestrial field vector are compared via a comparison device. If the two values do not agree, the interference field vectors are recalculated using the last terrestrial field vectors determined as agreeing.

SUMMARY OF THE INVENTION

It is an object of the invention to specify a method, for stabilizing the directional display of magnetic compasses against non-permanent, external interference sources, which operates more accurately.

This object is achieved by a method for stabilizing the directional display of magnetic compasses on bodies moving in a magnetic field, in particular the terrestrial magnetic field or a generated control field, against magnetically hard or magnetically soft interfering sources. In this method, in a prescribed spatial coordinate system $R(x_1,x_2,x_3)$ within a first measurement region there are conducted at at least one measuring point $P_a$, which is located in an interference-free region of the magnetic field, at successive instants $t_i$ i measurements ($i \geq 2$) of the three spatial components $B^1_{ai}$, $B^2_{ai}$, $B^3_{ai}$ of the respective field vector $B_{ai}$ of the magnetic field. Also, in this method, taking account of the temporal changes in the individual measured components, the measured components $B^1_{ai}$, $B^2_{ai}$, $B^3_{ai}$ of the respective magnetic field vector $B_{ai}$ are used to calculate at at least one measuring point $B_a$ the respective components $B^1_a$, $B^2_a$, $B^3_a$ and from these the absolute value of the magnetic field strength $|B_a|$. Further, in this method, for each individual measurement the absolute value of the magnetic field strength $|B_{ai}|$ is calculated from the components $B^1_{ai}$, $B^2_{ai}$, $B^3_{ai}$, measured at the at least one measuring point $P_a$ at the instants $t_i$ respectively, of the magnetic field vector. Also, in this method, on the basis of the calculated absolute values $|B_{ai}|$ and/or the respective measured components $B^1_{ai}$, $B^2_{ai}$, $B^3_{ai}$ of the magnetic field vector, a quality function $Q_i$ is determined which is a measure of the temporal distribution of the components $B^1_{ai}$, $B^2_{ai}$, $B^3_{ai}$, measured at the measuring point $P_a$ at the instants $t_i$, of the magnetic field vector and is a measure of the quality of the value of the magnetic field strength. Still further, in this method, taking account of the temporal changes in the individual measured components, for a further measuring point $P_b$, which is situated in a second measurement region separate from the first, and/or for an instant $t_j$ later than the instants $t_i$, an estimated absolute value $|B_{bj}|$ and/or estimated components $B^1_{bj}$, $B^2_{bj}$, $B^3_{bj}$ of the field vector are determined at the further measuring point $P_b$ on the basis of the calculated absolute value $|B_{ai}|$ and/or the respective components $B^1_{ai}$, $B^2_{ai}$, $B^3_{ai}$, measured in the first measurement region, of the magnetic field vector. Even still further, in this method, the components $B^1_{bk}$, $B^2_{bk}$, $B^3_{bk}$ of the magnetic field vector $B_k$ are measured for the measuring point $P_b$ at a later instant $t_k$ than the instants $t_i$ in the second measurement region at the further measuring point $P_b$. Still further, in this method, the absolute value $|B_{bk}|$ of the magnetic field strength of the individual measurements is calculated from the components $B^1_{bk}$, $B^2_{bk}$, $B^3_{bk}$, measured at the measuring point $P_b$ at the instants $t_k$ in each case, of the magnetic field vector $B_k$ of each measurement. Also, in this method, there is determined, on the basis of the calculated absolute values $|B_{bk}|$ and/or the respective measured components $B_{1bk}$, $B^2_{bk}$, $B^3_{bk}$ of the magnetic field vector, a quality function $Q_k$ which is a measure of the temporal distribution of the components $B^1_{bk}$, $B^2_{bk}$, $B^3_{bk}$, measured at the measuring point $P_b$ at the instants $t_k$, of the magnetic field vector and is a measure of the quality of the value of the magnetic field strength. Further, in this method, a weighting function or weighting matrix $G_k$ is determined as a function of the quality function $Q_i$ at the measuring point $P_a$ at the times $t_i$ and as a function of the quality function $Q_k$ at the measuring point $P_b$ at the times $t_k$. Even still further, in this method, the components $B^1_{bk}$, $B^2_{bk}$, $B^3_{bk}$ of the new magentic field vector $B_b$ are weighted with the weighting function or weighting matrix $G_k$ for the components $B^1_{aj}$, $B^2_{aj}$, $B^3_{aj}$ obtaied as an estimate for the second measurement region, of the magnetic field strength in such a way that a stabilized magnetic field vector $B^{stab}$ with the stabilized components $B^{stab1}_k$, $B^{stab2}_k$, $B^{stab3}_k$ obtained. Lastly, in this method, if desired, the above steps are repeated for further measurements at subsequent instants at further measuring points P and/or in further measurement regions and in each case a weighting function or weighting matrix is determined in order to obtain the further stabilized components.

In order to achieve the object of the invention, there is also described a second method for stabilizing the directional display of magnetic compasses on bodies moving in a magnetic field, in particular the terrestrial magnetic field or a generated control field, against magnetically hard or magnetically soft interfering sources. In this second method, in a prescribed spatial coordinate system $R(x_1,x_2,x_3)$ within a first measurement region I. there are conducted at one measuring point $P_i$, which is located in an interference-free region of the magnetic field, at successive instants $t_i$ nI measurements ($nI \geq 2$) of the three spatial components $B^1_i$, $B^2_i$, $B^3_i$ of the respective field vector $B_i$ of the magnetic field. Also, in this second method, the actual components $B^1_1$, $B^2_1$, $B^3_1$ of the field strength $B_1$ are determined from the measured components $B^1_i$, $B^2_i$, $B^3_i$ of the respective magnetic field vector $B_i$ by averaging the individual values:

$$B_1^m = \frac{1}{nI} \left( \sum_{i=1}^{nI} B_{1+i}^m \right)$$

Also, in this second method, the absolute value $|B_1|$ is calculated from the calculated averages of the components $B^1_1$, $B^2_1$, $B^3_1$ of the field strength $B_1$;

$$|B_1| = \{(B^1_1)^2 + (B^2_1)^2 + (B^3_1)^2\}^{1/2}.$$

Further, in this second method, there is determined on the basis of the respective measured individual components $B^1_i$, $B^2_i$, $B^3_i$ of the magnetic field vector a quality function $Q_1$ which is given by the inverse sum of the variances of the absolute values of the measured field vectors $|B_i|$:

$$Q_1 = 1 / \left[ \frac{1}{nI} \sum_{i=1}^{nI} (|B_{1+i}| - |B_1|)^2 \right]$$

where $|B_{1+i}| = \{(B^1_{1+i})^2 + (B^2_{1+i})^2 + (B^3_{1+i})^2\}^{1/2}$

Still further, in this second method. for a new measuring point $P_{II}$ in a second measurement region II. which is separate from the first measurement region. at an instant $t_j$ later than the instants $t_i$, the expected value for the absolute value $|B_j|$ of the field strength $B_j$ at the new measuring point is set equal to the absolute value of the old value $B_1$:

$$|B_j| = |B_1|.$$

Even still further, in this second method. at a later instant $t_j$ than the instants $t_i$ at the new measuring point $P_{II}$, in the second measurement region II, $n_{II}$ ($n_{II} \geq 2$) measurements are conducted for the components $B^1_j$, $B^2_j$, $B^3_j$ of the magnetic field vector $B_j$ at successive instants $t_{j+k}$. Also, in this second method, the absolute value $|B_j|$ of the magnetic field strength $B_j$ of the individual measurements is calculated from the components $B^1_{j+k}$, $B^2_{j+k}$, $B^3_{j+k}$, measured at the measuring point $P_{II}$ at the instants $t_{j+k}$ in each case, of the magnetic field vector $B_j$ of each measurement:

$$B_j^m = \frac{1}{nll} \sum_{k=1}^{nll} B_{j+k}^m$$

$$Q_j = 1 / \left[ \frac{1}{nll} \sum_{k=1}^{nll} (|B_{j+k}| - |B_j|)^2 \right]$$

where $|B_j| = \{(B^1_j)^2 + (B^2_j)^2 + (B^3_j)^2\}^{1/2}$ $|B_{j+k}| = \{(B^1_{j+k})^2 + (B^2_{j+k})^2 + (B^3_{j+k})^2\}^{1/2}$ Further, in this second method, a weighting function $G_j$ is determined as a function of the quality function $Q_1$ at the measuring point $P_I$ at the times $t_i$ and as a function of the quality function $Q_j$ at the measuring point $P_{II}$ at the times $t_{j+k}$, $G_j = Q_j/(Q_1 + Q_j)$.

Also, in this second method, the components $B^1_j$, $B^2_j$, $B^3_j$ of the new magnetic field vector $B_j$ are weighted with the aid of the weighting function $G_j$ having the components $B^1_i$, $B^2_i$, $B^3_i$, obtained in the first measurement region I, of the magnetic field strength in such a way that a stabilized magnetic field vector $B^{stab}$ having the stabilized components $Bstab1_j$, $B^{stab2}_j$, $B^{stab3}_j$ is obtained, $$B_j^{stab1} = B_I^1 + G_j(B_j^1 - B_I^1)$$

$$B_j^{stab2} = B_I^2 + G_j(B_j^2 - B_I^2)$$

$$B_j^{stab3} = B_I^3 + G_j(B_j^3 - B_I^3).$$

Lastly, in the second method, if desired, the steps above steps are repeated for further measurements at subsequent instants at further measuring points P and/or in further measurement regions and in each case a weighting function is determined in order to obtain the further stabilized components.

In order to achieve the object of the invention, there is also described a third method for stabilizing the directional display of magnetic compasses on bodies moving in a magnetic field, in particular the terrestrial magnetic field or a generated control field, against magnetically hard or magnetically soft interfering sources. In the third method, in a prescribed spatial coordinate system $R(x_1, x_2, x_3)$ within a first measurement region I, there are conducted at a measuring location at two different measuring points $P_{I1}$ and $P_{I2}$, which are located in an interference-free region of the magnetic field, at successive instants $t_i$ nI measurements ($nI \geq 2$) of the three field components $B^{11}_{1+i}$, $B^{21}_{1+i}$, $B^{31}_{1+i}$ of the field vector $B^1_1$ at the measuring point $P_{I1}$ and of the three field components $B^{12}_{1+i}$, $B^{22}_{1+i}$, $B^{32}_{1+i}$ of the field vector $B^2_1$ at the measuring location $P_{I2}$. Also, in the third method, the actual components Bhu $1_1$, $B^2_1$, $B^3_1$ of the field strength $B_1$ are determined by averaging the individual values:

$$B_1^m = \frac{1}{nI} \left( \sum_{i=1}^{nI} \frac{1}{2} (B^{m1}_{1+i} + B^{m2}_{1+i}) \right)$$

m being the index of the three components.

Further, in the third method, the absolute value $|B_1|$ is calculated from the calculated averages $B^1_1$, $B^2_1$, $B^3_1$ of the field strength $B_1$:

$|B_1| = \{(B^1_1)^2 + (B^2_1)^2 + (B^3_1)^2\}^{1/2}$.

Still further, in the third method, with the aid of the measured individual field components $B^{11}_{1+i}$, $B^{21}_{1+i}$, $B^{31}_{1+i}$ at the measuring point $P_{I1}$ and of the field components $B^{12}_{1+i}$, $B^{22}_{1+i}$, $B^{32}_{1+i}$ at the measuring point $P_{I2}$, a quality function $Q_1$ is determined which is determined by the sum of the quadratic deviations between the components measured in pairs at the measuring points:

$$Q_1 = 1 / \left[ \frac{1}{nI} \sum_{i=1}^{nI} \sum_{m=1}^{3} (B^{m1}_{1+i} - B^{m2}_{1+i})^2 \right].$$

Even still further, in the third method, for a new measuring location, comprising two measuring points $P_{II1}$, $P_{II2}$, in a second measurement region II, which is different from the first measurement region I, at an instant $t_j$ later than the instants $t_i$ the expected value for the absolute value $|B_j|$ of the field strength $B_j$ at the new measuring location is set equal to the absolute value of the old value $B_1$ in the first measuring region I, $|B_j| = |B_1|$.

Also, in the third method, at the new measuring location in the second measurement region II at the later instant $t_j$, there are conducted at the two measuring points $P_{II1}$, $P_{II2}$ of the new measuring location at successive instants $t_{j+k}$, nII measurements ($nII \geq 2$) for the three field components $B^{11}_{j+k}$, $B^{21}_{j+k}$, $B^{31}_{j+k}$ of the field vector $B^1_j$ at the measuring point $P_{II1}$ and the three field components $B^{12}_{j+k}$, $B^{22}_{j+k}$, $B^{32}_{j+k}$ of the field vector $B^2_j$ at the measuring point $P_{II2}$, and the above steps b) to d) are correspondingly repeated, with the result that the three components $B^1_j$, $B^2_j$, $B^3_j$, the absolute value $|B_j|$ and the quality function $Q_j$ are obtained for the new measuring location:

$$B_j^m = \frac{1}{nII} \left( \sum_{k=1}^{nII} \frac{1}{2} (B^{m1}_{j+k} + B^{m2}_{j+k}) \right)$$

m being the index of the three components, $|B_j| = \{(B^1_j)^2 + (B^2_j)^2 + (B^3_j)^2\}^{1/2}$.

$$Q_j = 1 / \left[ \frac{1}{nII} \sum_{k=1}^{nII} \sum_{m=1}^{3} (B^{m1}_{j+k} - B^{m2}_{j+k})^2 \right]$$

Further, in the third method, a weighting function $G_j$ is determined as a function of the calculated quality function $Q_1$ and the quality function $Q_j$:

$G_j = Q_j/(Q_1 + Q_j)$

Still further, in the third method, the components $B^1_j$, $B^2_j$, $B^3_j$ of the field vector $B_j$ are weighted with the weighting function $G_j$ and with the components $B^1_i$, $B^2_i$, $B^3_i$, obtained in the measurement region I, of the field strength $B_i$ in such a way that a stabilized field vector $B^{stabj}$ is obtained which has the components $B^{stab1}_j$, $B^{stab2}_j$, $B^{stab3}_j$:

$$B_j^{stab1} = B_I^1 + G_j(B_j^1 - B_I^1)$$

$$B_j^{stab2} = B_I^2 + G_j(B_j^2 - B_I^2)$$

$$B_j^{stab3} = B_I^3 + G_j(B_j^3 - B_I^3)$$

Lastly, in the third method, if desired, the above steps are repeated for further measurements at subsequent instants at further measuring locations, and a weighting function is determined in each case in order to obtain the further stabilized components,

BRIEF DESCRIPTION OF THE DRAWINGS

For a description of a method according to the invention, reference is made to the following description and accompanying drawings, in which.

DETAILED DESCRIPTION OF THE PREFERRED EMBODIMENTS

The basic concept of the method according to the invention is to be described in connection with the terrestrial magnetic field. A simple concrete example will be used for explanatory purposes in a supplementary way to explain the method according to the invention.

First step:

In a given spatial coordinate system, a plurality of measurements, for example ten, of the field components of the field vector of the terrestrial magnetic field are carried out successively at an initial measuring point which is situated within a magnetically interference-free region. Information related to the temporal variations in the field components can be obtained from these measured field components. Taking account of the temporal variations, the field components of an initial field vector are calculated from the measured field components, and the absolute value of the field strength is calculated from the initial field vector component.

Other possibilities for characterizing a variation in the terrestrial magnetic field in order to obtain initial values include:

1) measuring the location-dependent field gradients (measurement at a plurality of locations);

2) determining the field characteristic by calculating using a mathematical model given knowledge of the position; in the event of approximate knowledge of the position on the surface of the earth, algorithms can be specified (for example, known ones such as GEOMAG; MAGVAR; IGRF), in order to calculate the field characteristic of the terrestrial magnetic field. The geometries of artificially produced, quasi-static control fields can be calculated with the aid of the Biot-Savart law or also directly via the Maxwell equations;

3) determining the field characteristic with the aid of the GPS system (GPS: Geophysical Positioning System; MAGVAR model);

4) determining the field characteristic from a digital map;

5) determining the field characteristic by means of other additional sensors; for example, the distance from other vehicles can be determined using optical distance sensors, and from this the field distortion can be determined, at least qualitatively;

6) determining the magnetic field characteristic by means of user inputs (interference-affected/interference-free); finally it is evidently possible to inform the system qualitatively of environments affected by magnetic interference by means of user inputs (interference-affected/interference-free).

Figure 1:
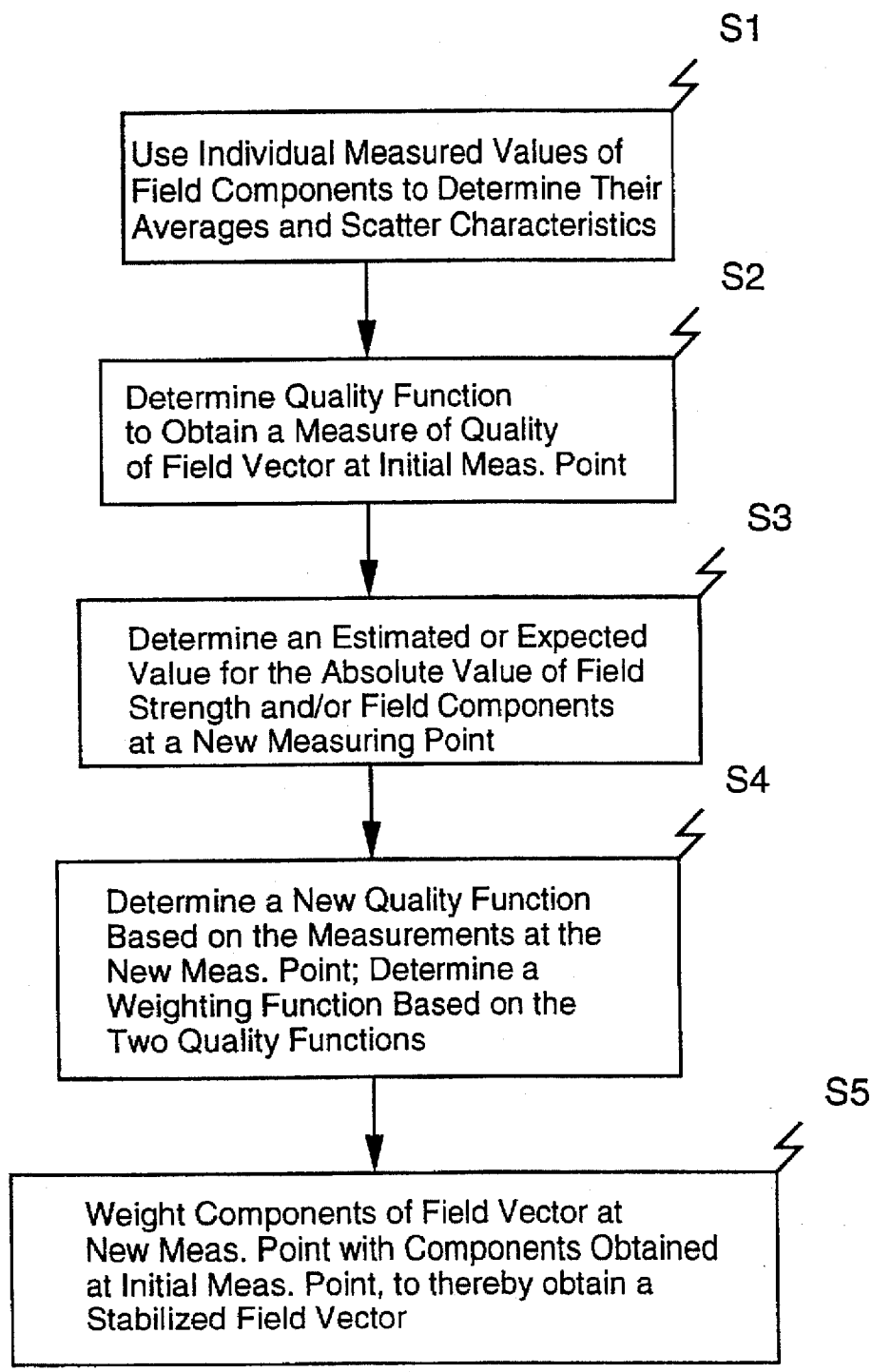
FIG. 1 is a flow diagram of a method according to a preferred embodiment of the invention.

In the concrete example, the first step is to use the individual measured values of the respective field components to determine their averages and their scatter characteristics (step S1 of FIG. 1). The value of the scatter contains information on the magnitude of the temporal fluctuations in the field components at the initial measuring point, because the more constant the terrestrial magnetic field, the smaller is the scatter of the values of the field component. An initial absolute value for the field strength is calculated from the averages of the field components. The individual absolute value for the field strength is calculated for each individual measurement from individual measured values of the field components.

Second step:

In the general case, a quality function is now determined in order to obtain a measure of the quality, that is to say the constancy, of the field vector at the initial measuring point (step S2 of FIG. 1).

The calculation of a quality function can be performed in a variety of ways, such as by:

1) using Kalman filters;

2) using maximum likelihood operators;

3) fitting an empirically determined distribution;

4) using neural networks;

5) using fuzzy logic;

6) using rule-based systems;

7) using other expert systems.

In the exemplary concrete case, the quality function is obtained by quadratically adding the differences of the individual absolute values of the field strength and the initial absolute value of the field strength, dividing the resulting sum by the number of the measurements and taking the inverse of this value as the quality function. In this case, the quality function is a pure number, that is to say a scalar. The more strongly the field components fluctuate in the measurements, the greater become the individual differences formed and the smaller becomes the value of the quality function.

Third step:

The next step is to determine for a new measuring point an estimated value or expected value for the absolute value of the field strength and/or also for the individual field components at the new measuring point (step S3 of FIG. 1). The starting point for this is the individual calculated absolute values of the field strength and/or the individual measured field components.

Furthermore, a plurality of measurements of the field components of the field vector of the terrestrial magnetic field are carried out at the new measuring point as likewise at the initial measuring point. A statement on temporal variations in the field components can be obtained, in turn, from these measured field components. Taking account of the temporal variations, the field components of a new field vector are calculated from the measured field components, and the absolute value of the field strength is calculated from the new field vector components.

The estimation of the true target values for the three field components can be performed by any of the following methods:

1) specifying the previous value, that is to say the latter is taken as the true target value;

2) mathematical extrapolation from the measured values of the past;

3) KI methods.

For the exemplary concrete case, in this third step the individual measured values of the respective field components at the new measuring point are used to determine their averages and their scatter characteristics. The value of the scatter includes here, as well, information on the magnitude of the temporal fluctuations in the field components at the new measuring point. An absolute value for the field strength at the new measuring point is calculated from the averages of the field components. The individual absolute value for the field strength is calculated for each individual measurement from the measured values of the field components.

Fourth step:

Here, as well, a new quality function is determined on the basis of the measurements at the new measuring point just as at the initial measuring point. A weighting function, which can be either a scalar or a matrix, depending on the form of the quality function, is determined from the two quality functions obtained (step S4 of FIG. 1).

In the concrete exemplary case, the field vector at the initial measuring point is adopted as the expected value or estimated value for the field vector at the new measuring point. The initial measuring point was, as specified above, calculated from the averages of the field components measured there.

On the basis of the field components measured individually at the new measuring point, their averages and their scatter are calculated, in turn, and the absolute value of the field vector at the new measuring point is calculated therefrom. The new quality function is described in the same way as previously, but now is calculated starting from the new measured values.

A weighting function is calculated from the two quality functions. For this purpose, the new quality function is divided by the sum of the previous and the new quality function. The weighting function is a scalar here, although for other examples it may be a non-scalar function.

Fifth step:

The components of the field vector at the new measuring point are weighted by means of the weighting function with the components, obtained at the initial measuring point, of the field vector, a stabilized field vector being obtained (step S5 of FIG. 1).

In the concrete example, the individual differences between the respective field components of the field vector at the new measuring point and those at the initial measuring point are formed and multiplied by the weighting function, which in the concrete example is a scalar. The values obtained in this case are added to the corresponding field components of the field vector at the initial measuring point. As a result, a new field vector is formed which is denoted as a stabilized field vector.

This computing algorithm can be continued in order to obtain stabilized vector components at further measuring points.

It becomes clear that the same computing operations can be carried out with the respective measured values for the initial measuring point and the further measuring point, and in the process the quality functions are obtained. The quality functions are combined to form a weighting function which is used to determine the extent to which the field vector determined at the further measuring point modifies the field vector of the initial measuring point in order to obtain the stabilized field vector.

Example 1

Figure 2:
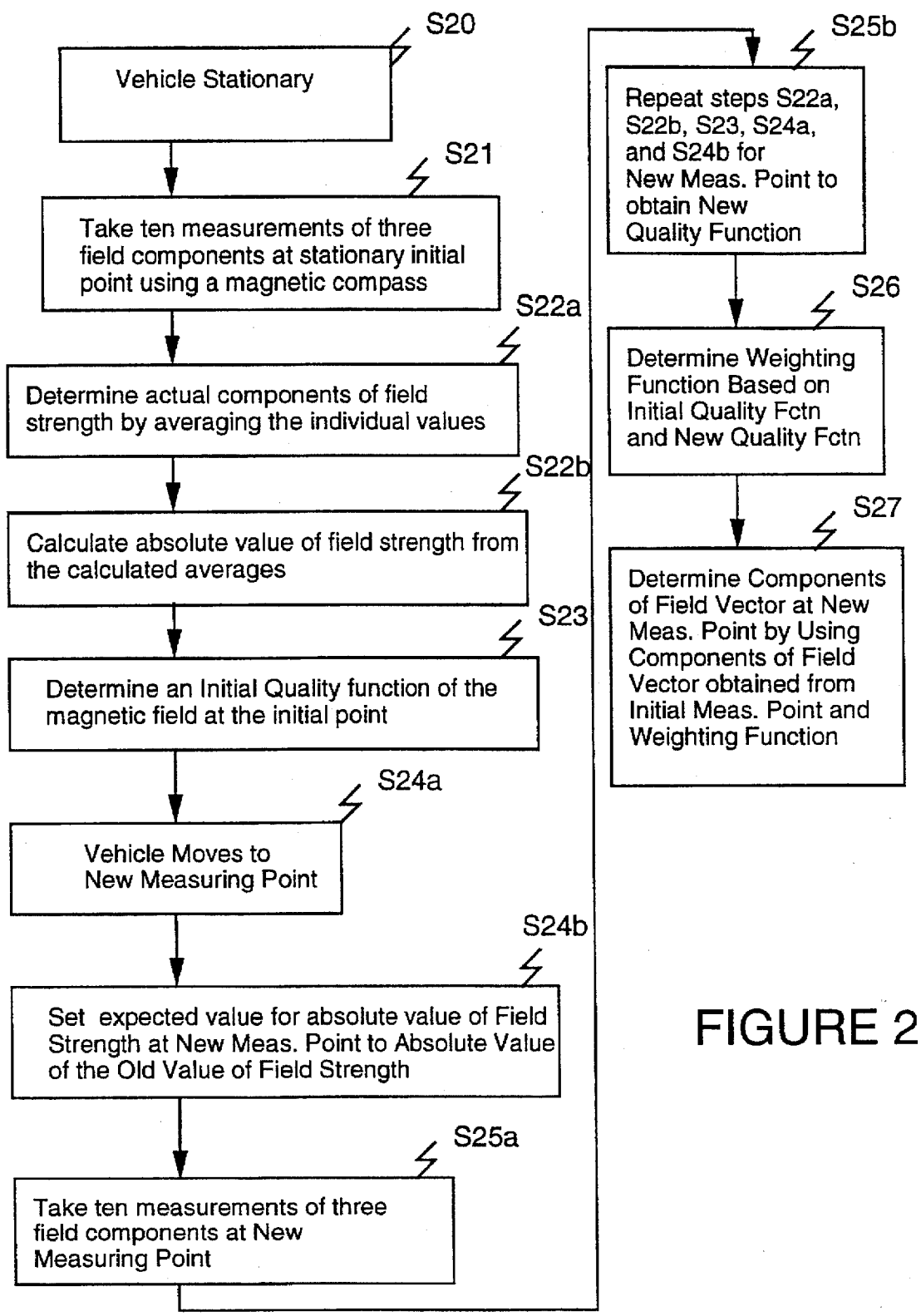
FIG. 2 is a flow diagram of the method according to the invention being applied to a first example.

The concrete example used above will be represented in more detail mathematically for the purpose of further explanation. The description of the first example will be given with reference to FIG. 2.

First step:

For a stationary vehicle (step S20 of FIG. 2), ten measurements of the three field components $B^1_{1+i}$, $B^2_{1+i}$, $B^3_{1+i}$ of the field vector $B_1$ are carried out at a stationary initial point $P_a$, using a magnetic compass arranged on a vehicle, from the instant $t=t_1$ up to the instant $t=t_{10}$ (step S21).

Second step:

Since the vehicle is stationary, the measurements of the field components will essentially be constant. The actual components $B^1_1$, $B^2_1$, $B^3_1$ of the field strength $B_1$ are determined by averaging the individual values (step S22a):

$$B_1^m = \frac{1}{10}\left(\sum_{i=1}^{10} B^m_{1+i}\right)$$

m=1, ..., 3, m being the index of the three components.

The absolute value $|B_1|$ is calculated from the calculated averages $B^1_1$, $B^2_1$, $B^3_1$ of the field strength $B_1$ (step S22b):

$$|B_1|=\{(B^1_1)^2+(B^2_1)^2+(B^3_1)^2\}^{1/2}$$

Third step:

Starting from the individual components, measured at the various measuring times, of the magnetic field $B^1_i$, $B^2_i$, $B^3_i$, a quality function $Q_1$ which is given by the inverse sum of the variances of the absolute values of the measured field vectors $|B_i|$, is determined (step S23):

$$Q_1 = 1/\left[\frac{1}{10}\sum_{i=1}^{10}(|B_{1+i}|-|B_1|)^2\right]$$

where $$|B_{1+i}|=\{(B^1_{1+i})^2+(B^2_{1+i})^2+(B^3_{1+i})^2\}^{1/2}$$

The quality function specifies a measure of the field quality at the initial point. The larger the fluctuations in the individual values, the smaller is the value of $Q_1$. Here, $Q_1$ is a scalar variable (but need not necessarily be so for other examples utilizing the teachings of the method according to the invention). The fuzziness is yielded as $\pm 1/Q_1^{1/2}$.

Fourth step:

The vehicle moves to a new measuring point P (step S24a), which is reached at a time $t_j$. With the aid of the calculated absolute value $|B_1|$ and of the quality function $Q_1$, the expected value for the absolute value $|B_j|$ of the field strength $B_j$ at the new measuring point is set equal to the absolute value of the old value of $B_i$, that is to say $|B_j|=|B_1|$ (step S24b).

Fifth step:

Ten measurements for the threefield components are carried out at the new measuring point at an instant $t_j$ later than the instants at the initial point (step S25a). The preceding steps two to four are correspondingly repeated, with the result that the three components $B^1_j$, $B^2_j$, $B^3_j$, the absolute value $|B_j|$ and the quality function $Q_j$ are obtained for the new measuring point (step S25b).

Sixth step:

A weighting function or weighting matrix is determined as a function of the calculated quality function $Q_1$ and the quality function $Q_j$ as follows (step S26):

$$G_j=Q_j/(Q_1+Q_j)$$

Seventh step:

The components $B^1_j$, $B^2_j$, $B^3_j$ of the field vector $B_j$ are weighted by means of the weighting matrix with the components $B^1_i$, $B^2_i$, $B^3_i$, obtained at the initial measuring point, of the field strength $B_i$ in such a way that a stabilized field vector $B^{stab}$ is obtained which has the components $B^{stab1}_j$, $B^{stab2}_j$, $B^{stab3}_j$ (step S27):

$$B^{stab1}_j = B^1_I + G_j(B^1_j - B^1_I)$$

$$B^{stab2}_j = B^2_I + G_j(B^2_j - B^2_I)$$

$$B^{stab3}_j = B^3_I + G_j(B^3_j - B^3_I)$$

This computing algorithm can be continued in order to obtain stabilized vector components at further measuring points.

Example 2

Figure 3:
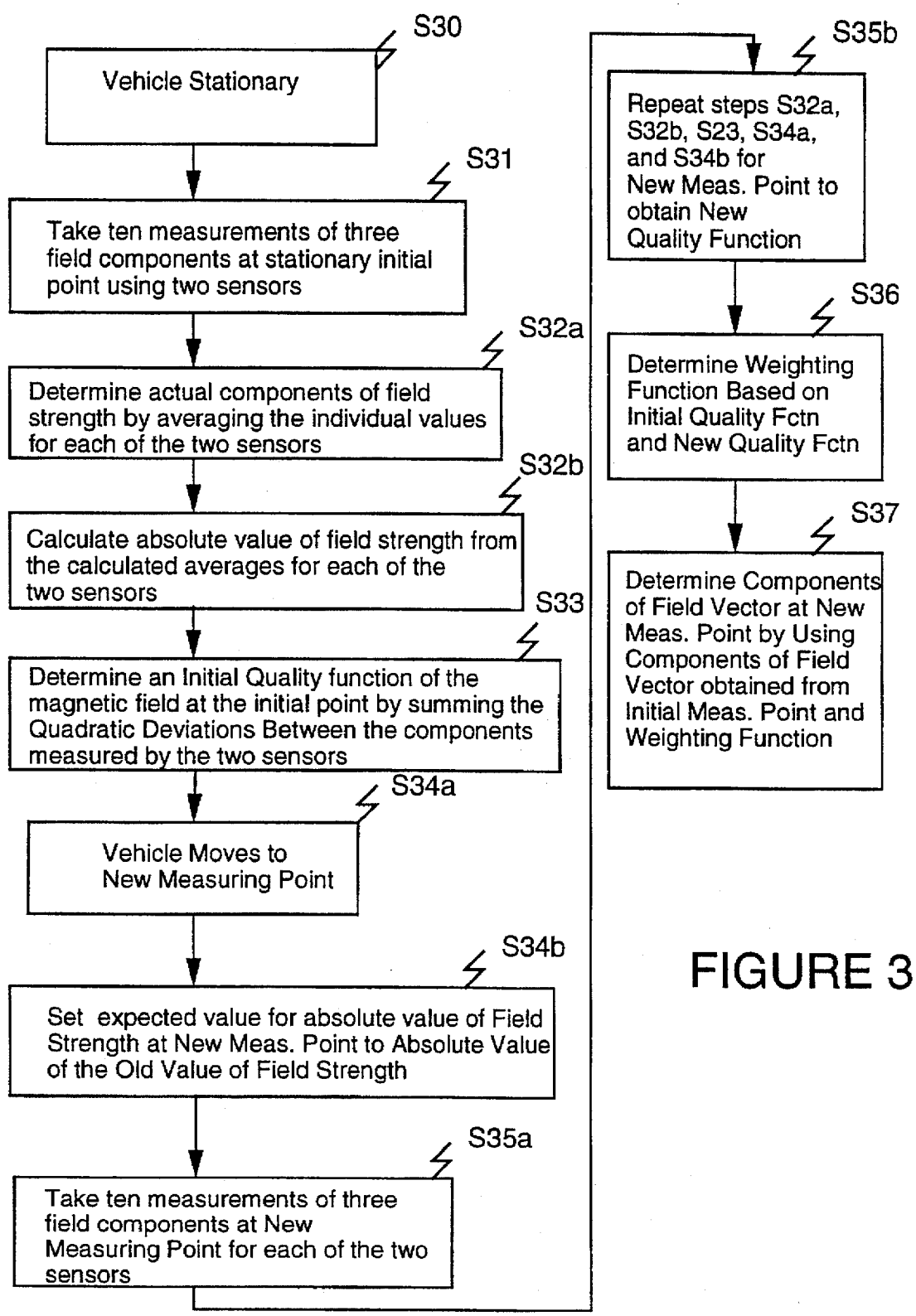
FIG. 3 is a flow diagram of the method according to the invention being applied to a second example.

Specified below as a further example of the method according to the invention is the case in which the three components of the terrestrial magnetic field are measured in a Cartesian coordinate system with the aid of two, digital magnetic compasses as sensors. The two magnetic compasses are fitted in a measurement region I at two different points $P^K$ ($K=1, 2$) of a vehicle. The description of the second example will be given with reference to FIG. 3.

First step:

From the instant $t=t_1$ up to the instant $t=t_{10}$, each sensor is used to conduct, in a stationary fashion (step S30) at the initial point, ten measurements of the three field components $B^{11}_{1+i}$, $B^{21}_{1+i}$, $B^{31}_{1+i}$ at the measuring point $P^1$ and of the three field components $B^{12}_{1+i}$, $B^{22}_{1+i}$, $B^{32}_{1+i}$ at the measuring point $P^2$ of the field vector $B^1_1$ and $B^2_1$, respectively (step S31).

Second step:

Since the vehicle is stationary, the measurements of the field components in the region of the initial point will be essentially constant and independent of the respective measuring point $P^K$ (K=1, 2). The actual components $B^1_1$, $B^1_2$, $B^1_3$ of the field strength $B_1$ are therefore determined by averaging the individual values (step S32a):

$$B^m_1 = \frac{1}{10} \left( \sum_{i=1}^{10} \frac{1}{2} (B^{m1}_{1+i} + B^{m2}_{1+i}) \right)$$

m being the index of the three components.

It has been established empirically that the individual components exhibit a constant absolute difference in pairs between the two sensors which varies only on the basis of the noise of the sensors, which is generally somewhat different in the two sensors. It is therefore justified to average between the two sensors.

The absolute value $|B_1|$ is calculated from the calculated averages $B^1_1$, $B^2_1$, $B^3_1$ of the field strength $B_1$ (step S32b):

$$|B_1| = \{(B^1_1)^2 + (B^2_1)^2 + (B^3_1)^2\}^{1/2}$$

Third step:

With the aid of the individual field components $B^{11}_{1+i}$, $B^{21}_{1+i}$, $B^{31}_{1+i}$ at the measuring point $P^1$ and the field components $B^{12}_{1+i}$, $B^{22}_{1+i}$, $B^{32}_{1+i}$ at the measuring point $P^2$, as measured at the two different measuring points, a quality function $Q_1$ is determined which is determined by the sum of the quadratic deviations between the components measured in pairs by means of the sensor 1 and 2, respectively (step S33):

$$Q_1 = 1 / \left[ \frac{1}{10} \sum_{i=1}^{10} \sum_{m=1}^{3} (B^{m1}_{1+i} - B^{m2}_{1+i})^2 \right]$$

The quality function indicates a measure of the homogeneity and thus of the quality of the measured field vector $B_1$ at the initial point. The greater the differences in the measured individual values, the smaller is the value of $Q_1$. Here, $Q_1$ is a scalar variable (but it could also be a matrix value for other examples that use the method according to the invention). The fuzziness is yielded as $\pm 1/Q_1^{1/2}$.

Fourth step:

The vehicle moves into a new measurement region II which is reached at a time $t_j$ (step S34a). With the aid of the calculated absolute value $|B_1|$ and the quality function $Q_1$, the expected value for the absolute value $|B_j|$ of the field strength $B_i$ in the new measurement region is set equal to the absolute value of the old value of $B_1$, that is to say $|B_j|=|B_1|$ (step S34b).

Fifth step:

In the new measurement region II, at an instant $t_j$ later than the instants $t_i$ at the initial point, ten measurements are conducted respectively by means of the two sensors for the three field components $B^{11}_{j+i}$, $B^{21}_{j+i}$, $B^{31}_{j+i}$ at the measuring point $P^1$ and of the three field components $B^{12}_{j+i}$, $B^{22}_{j+i}$, $B^{32}_{j+i}$ at the measuring point $P^2$ of the associated field vectors $B^1_j$ and $B^2_j$, respectively (step S35a).

The preceding steps two to four are repeated correspondingly, with the result that the three components $B^1_j$, $B^2_j$, $B^3_j$, the absolute value $|B_j|$ and the quality function $Q_j$ are obtained for the new measuring point, specifically (step S35b):

$$B^m_j = \frac{1}{10} \left( \sum_{i=1}^{10} \frac{1}{2} (B^{m1}_{j+i} + B^{m2}_{j+i}) \right)$$

m being the index of the three components.

$$|B_j| = \{(B^1_j)^2 + (B^2_j)^2 + (B^3_j)^2\}^{1/2}$$

$$Q_j = 1 / \left[ \frac{1}{10} \sum_{i=1}^{10} \sum_{m=1}^{3} (B^{m1}_{j+i} - B^{m2}_{j+i})^2 \right]$$

A measure of the quality of the field vector in the new measurement region is obtained, in turn, by the quality function $Q_n$.

Sixth step:

A weighting function $G_j$ is determined as a function of the calculated quality function $Q_1$ and the quality function $Q_j$, as follows (step S36):

$$G_j = Q_j / (Q_1 + Q_j)$$

Seventh step:

The components $B^1_j$, $B^2_j$, $B^3_j$ of the field vector $B_j$ are weighted by means of the weighting matrix $G_j$ with the components $B^1_i$, $B^2_i$, $B^3_i$, obtained in the measurement region, of the field strength $B_i$ in such a way that a stabilized field vector $B^{stab}$ is obtained which has the components $B^{stab1}_j$, $B^{stab2}_j$, $B^{stab3}_j$ (step S37):

$$B^{stab1}_j = B^1_I + G_j (B^1_j - B^1_I)$$

$$B^{stab2}_j = B^2_I + G_j (B^2_j - B^2_I)$$

$$B^{stab3}_j = B^3_I + G_j (B^3_j - B^3_I)$$

This computing algorithm can be continued correspondingly for the further time lapse $t_{i+j+p}$ and/or in further measurement regions, in order in this way to obtain the respective weighting function or weighting matrix and the new stabilized vector components.

While a preferred embodiment of the invention and concrete examples utilizing the preferred embodiment have been described herein, modification of the described embodiment may become apparent to those of ordinary skill in the art, following the teachings of the invention, without departing from the scope of the invention set forth in the appended claims. For example, while two sensors are used in Example 2 described above, the method according to the invention would operate with any number of sensors being used together to derive a stabilized field vector.

What is claimed is:

1. A method for stabilizing a directional display of magnetic compasses on bodies moving in a magnetic field, against magnetically hard or magnetically soft interfering sources, said method comprising the steps of:

a) measuring three spatial components $B^1_{ai}, B^2_{ai}, B^3_{ai}$ as a respective field vector $B_{ai}$ of the magnetic field at a first measuring point $P_a$ which is located in an interference-free region in the magnetic field, the measuring being made in a prescribed spatial coordinate system $R(x_1,x_2,x_3)$ within a first measurement region, at successive instants $t_i$, for i measurements, i being an integer greater than or equal to two;

b) using the measured three spatial components $B^1_{ai}, B^2_{ai}, B^3_{ai}$ of the respective field vector $B_{ai}$ to calculate, at the first measuring point $P_a$, three spatial components $B^1_a, B^2_a, B^3_a$;

c) calculating an absolute value of the magnetic field strength $|B_a|$ from the measured three spatial components $B^1_{ai}, B^2_{ai}, B^3_{ai}$ for each successive instant $t_i$ at the at least one measuring point $P_a$, wherein temporal changes in the measured three spatial components $B^1_{ai}, B^2_{ai}, B^3_{ai}$ are taken into account;

d) determining a first quality function $Q_i$ on the basis of at least one of the calculated absolute values $|B_{ai}|$ and the measured three spatial components $B^1_{ai}, B^2_{ai}, B^3_{ai}$, said first quality function $Q_i$ being a measure of a temporal distribution of the measured three spatial components $B^1_{ai}, B^2_{ai}, B^3_{ai}$ measured at the first measuring point $P_a$ at the successive instants $t_i$, and said first quality function $Q_i$ also being a measure of quality of a value corresponding to the magnetic field strength;

e) determining an estimated absolute value $|B_{bj}|$ and estimated components $B^1_{bj}, B^2_{bj}, B^3_{bj}$ as a second field vector $B_k$ at a second measuring point $P_b$ and at a second instant $t_j$ on the basis of at least one of the calculated absolute value $|B_{ai}|$ and the measured three spatial components $B^1_{ai}, B^2_{ai}, B^3_{ai}$ measured in the first measurement region, to obtain components $B^1_{aj}, B^2_{aj}, B^3_{aj}$, wherein the second measuring point $P_b$ is situated in a second measurement region separate from the first measurement region, and the second instant $t_j$ is later than any of the successive instants $t_i$, and wherein the temporal changes in the measured three spatial components $B^1_{ai}, B^2_{ai}, B^3_{ai}$ are taken into account;

f) measuring components $B^1_{bk}, B^2_{bk}, B^3_{bk}$ of the second field vector $B_k$ at the second measuring point $P_b$ and at a third instant $t_k$ which is later than the successive instants $t_i$;

g) calculating an absolute value of the magnetic field strength $|B_{bk}|$ from the components $B^1_{bk}, B^2_{bk}, B^3_{bk}$ measured at the second measuring point $P_b$ and at the third instant $t_k$;

h) determining, on the basis of the calculated absolute value $|B_{bk}|$ and the respective measured components $B^1_{bk}, B^2_{bk}, B^3_{bk}$ of the second field vector $B_k$, a second quality function $Q_k$ which is a measure of a temporal distribution of the components $B^1_{bk}, B^2_{bk}, B^3_{bk}$, measured at the second measuring point $P_b$ and at the third instant $t_k$ and which is a measure of a quality of a value representing the magnetic field strength;

i) determining a weighting function $G_k$ as a function of the first quality function $Q_i$ at the first measuring point $P_a$ at the successive instants $t_i$ and as a function of the second quality function $Q_k$ at the second measuring point $P_b$ at the third instant $t_k$; and j) weighing the components $B^1_{bk}, B^2_{bk}, B^3_{bk}$ with the weighting function $G_k$ for the components $B^1_{aj}, B^2_{aj}, B^3_{aj}$ obtained as an estimate for the second measurement region, such that a stabilized magnetic field vector $B^{stab}$ with stabilized components $B^{stab1}_k, B^{stab2}_k, B^{stab3}_k$ is obtained as a result thereof.

2. The method according to claim 1, further comprising the step of:

k) repeating the steps e) to j) for further measurements at subsequent instants at further measuring points P and in further measurement regions, wherein a new weighting function is determined in order to obtain further stabilized components.

3. The method according to claim 1, wherein the weighting function $G_k$ is a weighting matrix.

4. The method according to claim 1, wherein the weighting function $G_k$ is a scalar value.

5. The method according to claim 1, wherein the magnetic field is one of a terrestrial magnetic field and a generated control field.

6. A method for stabilizing the directional display of magnetic compasses on bodies moving in a magnetic field, against magnetically hard or magnetically soft interfering sources, said method comprising the steps of:

a) conducting a plurality of measurements of three spatial components $B^1_j, B^2_j, B^3_j$ of a respective field vector $B_i$ of the magnetic field, said conducting being made in a prescribed spatial coordinate system $R(x_1,x_2,x_3)$ within a first measurement region and at a first measuring point $P_1$, which is located in an interference-free region of the magnetic field, at successive instants $t_i$, i being an integer greater than or equal to two;

b) determining actual components $B^1_1, B^2_1, B^3_1$ of a field vector $B_1$ of the magnetic field from the measured components $B^1_i, B^2_i, B^3_i$ of the respective magnetic field vector Bi according to the following equation:

$$B_1^m = \frac{1}{nl} \left( \sum_{i=1}^{nl} B_{1+i}^m \right);$$

c) calculating an absolute value $|B_1|$ of the respective field vector $B_i$ from the actual components $B^1_1, B^2_1, B^3_1$ of the field vector $B_1$ calculated in the step b) according to the following equation:

$$|B_1| = \{(B^1_1)^2 + (B^2_1)^2 + (B^3_1)^2\}^{1/2};$$

d) determining, on the basis of the measured three spatial components $B^1_i, B^2_i, B^3_i$, first quality function $Q_1$ which is given by the inverse sum of the variances of the absolute values of the respective field vectors $|B_i|$ according to the following equation:

$$Q_1 = 1 / \left[ \frac{1}{nl} \sum_{i=1}^{nl} (|B_{1+i}| - |B_1|)^2 \right];$$

where $|B_{1+i}| = \{(B^1_{1+i})^2 + (B^2_{1+i})^2\}^{1/2}$ e) setting an expected value for an absolute value $|B_j|$ of a field vector $B_j$ at a second measuring point $P_{II}$, equal to the absolute value $|B_1|$ wherein the setting is made in the step e) in a second measurement region, which is separate from the first measurement region, at an instant $t_j$ later than the successive instants $t_i$;

f) conducting a plurality of measurements for components $B^1_j$, $B^2_j$, $B^3_j$ of the field vector $B_j$ at successive instants $t_{j+k}$ and at the new measuring point $P_{II}$ in the second measurement region, to obtain components $B^1_{j+k}$, $B^2_{j+k}$, $B^3_{j+k}$, wherein the successive instants $t_{j+k}$ are all later in time than the successive instants $t_i$;

g) calculating the absolute value $|B_j|$ of the field vector $B_j$ and a second quality function $Q_j$ from the components $B^1_{j+k}$, $B^2_{j+k}$, $B^3_{j+k}$, the calculations in the step g) being performed according to the following equations:

$$B_j^m = \frac{1}{nII} \sum_{k=1}^{nII} B_{j+k}^m$$

$$Q_j = 1/\left[ \frac{1}{nII} \sum_{k=1}^{nII} (|B_{j+k}| - |B_j|)^2 \right];$$

where $|B_j| = [(B^1_j)^2 + (B^2_j)^2 + (B^3_j)^2]^{1/2}$ $|B_{j+k}| = [(B^1_{j+k})^2 + (B^2_{j+k})^2 + (B^3_{j+k})^2]^{1/2}$ h) determining a weighting function $G_j$ as a function of the first quality function $Q_1$ at the first measuring point $P_I$, at the successive instants $t_i$ and as a function of the second quality function $Q_j$ at the second measuring point $P_{II}$, at the successive instants $t_{j+k}$, wherein the weighting function $G_j$ is determined according to the following equation:

$G_j = Q_j/(Q_1 + Q_j);$ and i) weighting the components $B^1_j$, $B^2_j$, $B^3_j$ of the field vector $B_j$ using the weighting function $G_j$ and the three spatial components $B^1_i$, $B^2_i$, $B^3_i$, obtained in the first measurement region, in such a way that a stabilized magnetic field vector $B^{stab}$ having a stabilized components $B^{stab1}_j$, $B^{stab2}_j$, $B^{stab3}_j$ is obtained as a result thereof.

7. The method according to claim 6, wherein the stabilized magnetic field vector Bstab is obtained according to the following equation:

$$B_j^{stab1} = B_I^1 + G_j (B_j^1 - B_I^1)$$

$$B_j^{stab2} = B_I^2 + G_j (B_j^2 - B_I^2)$$

$$B_j^{stab3} = B_I^3 + G_j (B_j^3 - B_I^3).$$

8. The method according to claim 6, wherein the weighting function $G_k$ is a weighting matrix.

9. The method according to claim 6, wherein the weighting function $G_k$ is a scalar value.

10. The method according to claim 6, further comprising the step of:

j) repeating the steps e) to i) for further measurements at subsequent instants at further measuring points P and in further measurement regions, wherein a weighting function is determined in order to obtain further stabilized components.

11. The method according to claim 6, wherein the magnetic field is one of a terrestrial magnetic field and a generated control field.

12. A method for stabilizing a directional display of magnetic compasses on bodies moving in a magnetic field, against magnetically hard or magnetically soft interfering sources, comprising the steps of:

a) conducting, in a prescribed spatial coordinate system $R(x_1, x_2, x_3)$ within a first measurement region I and at two different measuring points $P_{I1}$ and $P_{I2}$, which are located in an interference-free region of the magnetic field, at successive instants $t_i$, nI measurements of three field components $B^{11}_{1+i}$, $B^{21}_{1+i}$, $B^{31}_{1+i}$ of a field vector $B^1_1$ at the measuring point $P_{I1}$ and of three field components $B^{12}_{1+i}$, $B^{22}_{1+i}$, $B^{32}_{1+i}$ of a field vector $B^2_1$ at the measuring location $P_{I2}$, wherein nI is an integer greater than or equal to two;

b) determining actual components $B^1_1$, $B^2_1$, $B^3_1$ of a field strength $B_1$ by averaging the values obtained in the step a) according to the following equation:

$$B_1^m = \frac{1}{nI} \left( \sum_{i=1}^{nI} \frac{1}{2} (B_{1+i}^{m1} + B_{1+i}^{m2}) \right)$$

wherein m is an index of the respective three field components;

c) calculating an absolute value $|B_1|$ from the determined actual components $B^1_1$, $B^2_1$, $B^3_1$ of the field strength $B_1$ according to the following equation:

$|B_1| = [(B^1_1)^2 + (B^3_1)^2]^{1/2};$ d) determining a first quality function $Q_1$ with the aid of the measured field components $B^{11}_{1+i}$, $B^{21}_{1+i}$, $B^{31}_{1+i}$ at the measuring point $P_{I1}$ and of the measured field components $B^{12}_{1+i}$, $B^{22}_{1+i}$, $B^{32}_{1+i}$ at the measuring point $P_{I2}$, the first quality function $Q_1$ being determined by summing quadratic deviations between the respective measured field components conducted in pairs at the respective measuring points $P_{I1}$ and $P_{I2}$ according to the following equation:

$$Q_1 = 1/\left[ \frac{1}{nI} \sum_{i=1}^{nI} \sum_{m=1}^{3} (B_{1+i}^{m1} - B_{1+i}^{m2})^2 \right];$$

e) setting an expected value for an absolute value $|b_j|$ of a field strength Bj at a new measuring location equal to the absolute value $|B_1|$, the new measuring location including two measuring points $P_{II1}$, $P_{II2}$, in a second measurement region II, which is different from the first measurement region I, at an instant $t_j$ later than the instants $t_i$; the expected value for the absolute value $|B_j|$ of the field strength $B_j$ at the new measuring location is set equal to the absolute value of the old value $B_1$ in the first measuring region I;

f) conducting. at the two measuring points $P_{II1}$, $P_{II2}$ in the second measurement region II at successive instants $t_{j+k}$ later than the instant $t_j$, nII measurements for the three field components $B^{11}_{j+k}$, $B^{21}_{j+k}$, $B^{31}_{j+k}$ of the field vector $B^1_j$ at the measuring point $P_{II1}$ and the three field components $B^{12}_{j+k}$, $B^{22}_{j+k}$, $B^{32}_{j+k}$ of the field vector $B^2_j$ at the measuring point $P_{II2}$, wherein nII is an integer greater than or equal to two;

g) repeating the steps b) through d) such that the three components $B^1_j$, $B^2_j$, $B^3_j$, the absolute value $|B_j|$ and a second quality function $Q_j$ are obtained for the new measuring location. according to the following equations:

$$B_j^m = \frac{1}{nll} \left( \sum_{k=1}^{nll} \frac{1}{2} (B_{j+k}^{m1} + B_{j+k}^{m2}) \right)$$

wherein m is an index of the three components, $$|B_j| = \{(B^1{}_j)^2 + (B^2{}_j)^2 + (B^3{}_j)^2\}^{1/2},$$

$$Q_j = 1 / \left[ \frac{1}{nll} \sum_{k=1}^{nll} \sum_{m=1}^{3} (B_{j+k}^{m1} - B_{j+k}^{m2})^2 \right];$$

h) determining a weighting function $G_j$ as a function of the first quality function $Q_1$ and the second quality function $Q_j$ according to the following equation:

$$G_j = Q_j/(Q_1 + Q_j);$$

and i) weighting the components $B^1{}_j$, $B^2{}_j$, $B^3{}_j$ of the field vector $B_j$ with the weighting function $G_j$ and with the components $B^1{}_I$, $B^2{}_I$, $B^3{}_I$, obtained in the measurement region I, of the field strength $B_I$, wherein a stabilized field vector $B^{stab j}$ is obtained which has the components $B^{stab1}{}_j$, $B^{stab2}{}_j$, $B^{stab3}{}_j$:

$$B_j^{stab1} = B_I^1 + G_j(B_j^1 - B_I^1)$$

$$B_j^{stab2} = B_I^2 + G_j(B_j^2 - B_I^2)$$

$$B_j^{stab3} = B_I^3 + G_j(B_j^3 - B_I^3)$$

13. The method according to claim 12, further comprising the step of:

j) repeating steps e) to i) for further measurements at subsequent instants and at further measuring locations, wherein a weighting function is determined in each case in order to obtain the further stabilized components.

* * * * *